Patented Jan. 19, 1932

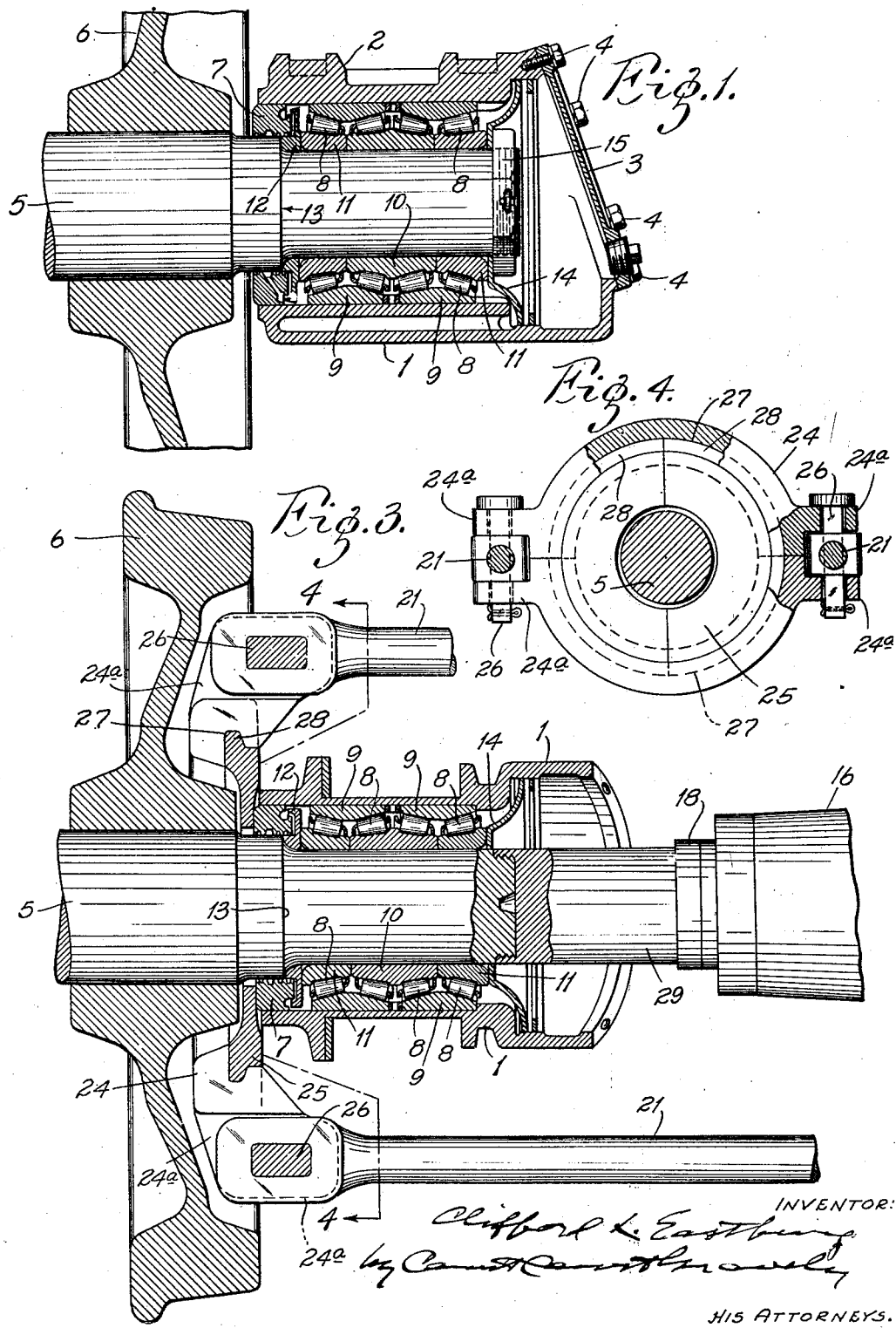

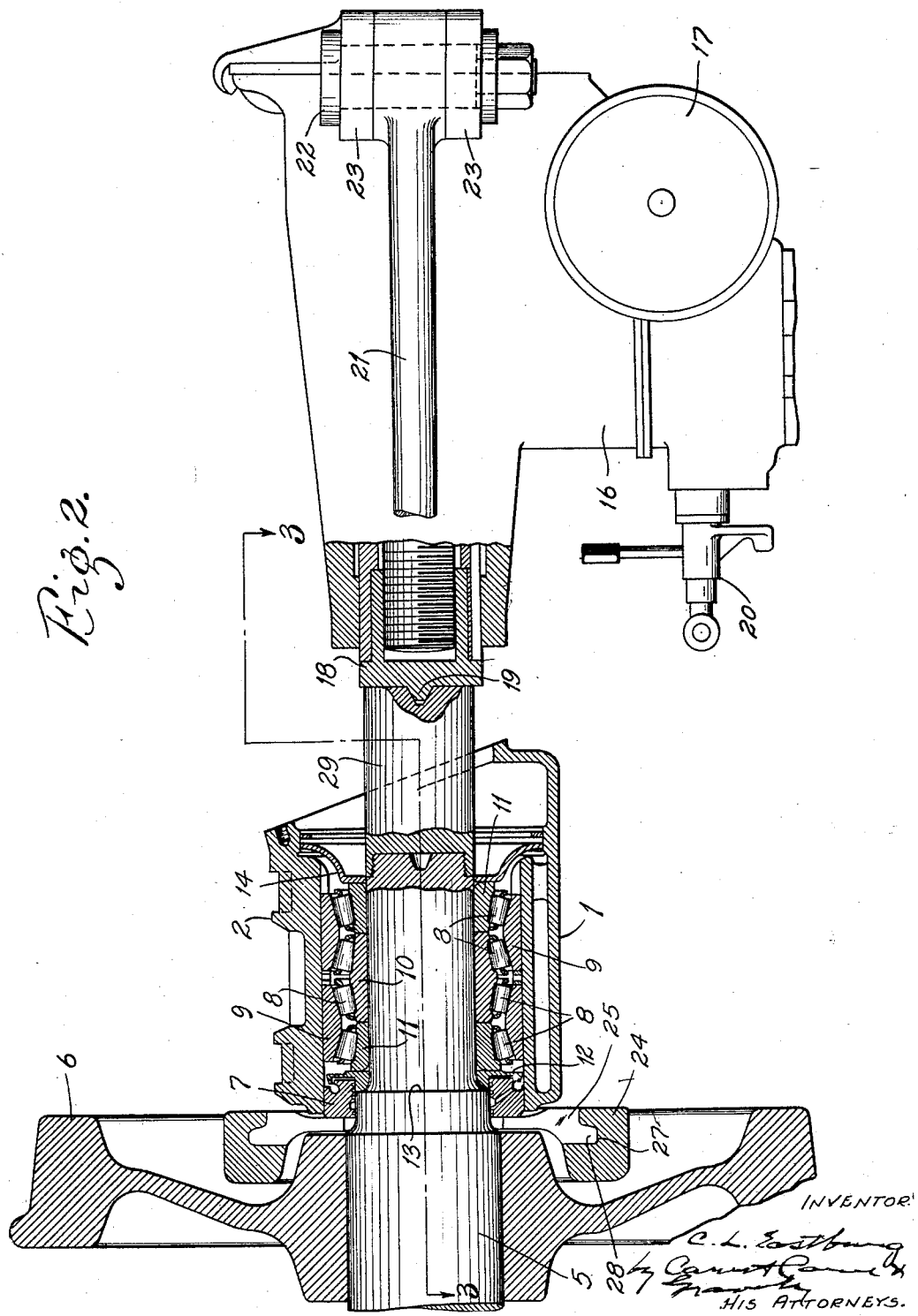

1,842,155

UNITED STATES PATENT OFFICE

CLIFFORD L. EASTBURG, OF CANTON, OHIO, ASSIGNOR TO THE TIMKEN ROLLER BEARING COMPANY, OF CANTON, OHIO, A CORPORATION OF OHIO

BEARING PULLER

Application filed August 21, 1930. Serial No. 476,800.

This invention relates to bearing pullers. Its principal object is to provide a portable bearing puller that can be readily attached to railway car trucks equipped with roller bearing journal boxes of the outboard type to quickly and easily remove the roller bearings. Another object is to adapt the puller for use with journal boxes of different sizes. Other objects are simplicity and cheapness of construction, ease of operation and compactness of design. The invention consists principally in the bearing puller, and in the parts and combinations and arrangements of parts hereinafter described and claimed.

In the accompanying drawings, which form part of this specification and wherein like symbols refer to like parts wherever they occur:

Fig. 1 is a vertical longitudinal section through one end of one of the axles of the railway car truck equipped with a roller bearing journal box of the outboard type, Fig. 2 is a view showing a pulling device embodying my invention placed in position to remove the roller bearings, Fig. 3 is a horizontal section on the line 3—3 of Fig. 2; and Fig. 4 is a vertical transverse cross-section on the line 4—4 of Fig. 3.

The outboard type of roller bearing journal box construction illustrated in the accompanying drawings comprises a journal box 1 having a seat 2 on its top adapted to cooperate with standard truck side frames. The outer end of the journal box 1 has an opening closed by a cover plate 3 secured by screws 4. The outer end of a railway car truck axle 5 extends into the journal box 2 and a car wheel 6 is pressed on said axle adjacent to the inner end of said journal box. The annular space between the inner end of the journal box 2 and the axle 5 is closed by means of a closure ring 7 that is bolted or otherwise removably secured to said journal box.

Interposed between the axle 5 and journal box 2 are antifriction bearings, preferably tapered roller bearings. In the construction illustrated, the bearing comprises four series of tapered rollers 8. The two bearing cups 9 are double cups, each provided with two raceways. The middle cone 10 is likewise a double member, having two raceways. The two end cones 11 are single cones, the innermost end cone abutting against an annular oil retainer 12 mounted on the axle between a shoulder 13 thereon and the inner end of said innermost cone, and the outermost cone abutting against an annular oil retainer 14 that is held in place by means of a lock nut 15 threaded onto the end of said axle. Clamped on the axle between the nut and the outermost bearing cone is an annular oil retaining ring.

The pulling device for removing the hereinbefore described antifriction bearings from the axle comprises a power jack 16 supported on wheels 17 and having a horizontally movable ram 18 provided at its outer end with a centrally disposed conical projection or lug 19 adapted to fit a standard axle center. The power jack is operated by fluid pressure controlled by a suitable valve 20. Horizontal reach rods 21 extend longitudinally of the ram 18 of the wheeled jack 16 on opposite sides thereof and are connected at one end to the jack housing by means of removable pivot bolts 22 that extend vertically through alined openings provided therefor in said ends of said reach rods and in vertically spaced outstanding lugs 23 on the sides of said jack housing.

Said reach rods 21 extend beyond the outer end of the ram 18 of the wheeled power jack; and the outer ends of said rods are adapted to fit between vertically spaced lugs 24a which project horizontally from the upper and lower sections of a horizontally split annular holder 24 adapted to receive and support a radially split annular stripper plate 25. As shown in the drawings, the stripper plate holder 24 is removably secured to the outer ends of the reach rods 21 by means of pins 26 of rectangular cross-section, which extend through vertically alined rectangular openings in the outer ends of said reach rods and the lugs 24a on the upper and lower halves of said stripper plate holder. The horizontally split stripper plate holder 24 is provided at its inner periphery with an annular groove 27 adapted to receive an annular rib 28 in the outer periphery of the stripper plate 25, thereby preventing relative axial movement of the stripper plate and its holder.

With the above arrangement, when it is desired to remove the antifriction bearings from the end of the axle, the end cover plate 3 is removed from the outer end of the outboard journal box and the nut 15 is removed from the end of the axle through the opening uncovered by removal of said cover plate. The power jack 16 is then wheeled into position opposite the exposed end of the axle, with the ram 18 of said jack in axial alinement with said axle. The two-piece stripper plate 25 is then placed around the axle between the outer end of the wheel hub and the inner end of the journal box, with the outer face of said stripper plate in abutting relation to the adjacent end face of the closure ring 7 for the inner end of said journal box. The two-piece stripper plate holder 24 is then placed about the stripper plate 25 and attached to the free outer ends of the reach rods 21 by inserting the rectangular pins 26 in the rectangular openings provided therefor in the ends of the reach rods and in the outstanding lugs 24a on the upper and lower halves of said stripper plate holder. The valve 20 of the power jack is then operated to cause the ram 18 to bear axially against the end of the axle and thereby press the axle through the bearing cones 10 and 11, which are held against movement with the axle by means of the stripper plate 25 and holder 24 mounted on the reach rods 21, which, in turn, are anchored to the power jack.

As shown in Fig. 4, the stripper plate 25 is mounted in the holder 24 with its split disposed vertically, that is, at right angles to the split in the holder 24. It is noted that stripper plates of different sizes and shapes may be provided for use with different sizes and designs of journal boxes. It is also noted that in cases where the ram of the jack is of larger diameter than the bore of the bearing that is to be removed, a spacer or adapter 29 of the proper length and of a diameter equal to or slightly less than the bore of the bearing is threaded onto the axle end in position to be engaged by the said ram. The ram engaging end of said adapter is provided with a conical depression adapted to receive the conical projection 19 in the outer end of the ram.

The hereinbefore described bearing puller has many advantages. It may be readily moved from one place of use to another; it can be readily attached to the roller bearing axle construction to quickly and easily remove the roller bearings therefrom; it is of simple, economical and compact construction and the only change necessary to adapt the device for use with journal boxes of different sizes is to place in the holder a stripper plate having an opening therein of the diameter required.

Obviously, the invention is applicable to roller bearing constructions of different types; therefore, I do not wish to be limited to the type of roller bearing construction shown and described.

What I claim is:

1. A device for removing the bearing of a journal box from a railway car axle, said device comprising a portable ram adapted to bear axially against the end of said axle, reach rods secured at one end to the body of said device and extending beyond the outer end of said ram, a stripper plate adapted to fit around the axle behind said journal box, and a split holder for said stripper plate, each section of said split stripper plate holder being removably secured to the outer ends of each of said reach rods.

2. A device for removing the roller bearings of a journal box from a railway car axle, said device comprising a portable power driven jack having a ram adapted to bear axially against the end of said axle, reach rods secured at one end to the body of said jack and extending beyond the outer end of said ram, an annular stripper plate adapted to fit around the axle behind said journal box, and an annular holder for said stripper plate removably secured to the outer ends of said reach rods.

3. A device for removing the roller bearings of an outboard journal box from a railway car axle, said device comprising a portable power driven jack having a ram adapted to bear axially against the end of said axle, said ram being provided at its outer end with a projection adapted to fit a standard axle center, reach rods removably secured at one end to the body of said jack and extending beyond the outer end of said ram, an annular radially split stripper plate adapted to fit around the axle behind said journal box, and an annular radially split holder for said stripper plate, each section of said split stripper plate holder being removably secured to the outer end of each reach rod.

4. A device for removing the bearing of a journal box from a railway car axle having a screw-threaded end, said device comprising a portable ram adapted to bear axially against the end of said axle, reach rods secured at one end to said device and extending beyond the outer end of said ram, a stripper plate adapted to fit around the axle behind said journal box, a holder for said stripper plate removably secured to the outer ends of each reach rod, and an adapter of a diameter equal to or slightly less than the bore of the bearing adapted to be interposed between the opposing ends of said axle and said ram and having a screw-threaded end adapted to engage the screw-threaded end of said axle.

5. A device for removing the roller bearings of an outboard journal box from a railway car axle having a threaded end, said device comprising a portable power driven jack having a ram adapted to bear axially against the end of said axle, horizontal reach rods secured to the opposite sides of the jack body and extending beyond the outer end of said ram, a stripper plate adapted to fit around the axle behind said journal box, a holder for said stripper plate removably secured to the outer end of each reach rod, and an adapter of a diameter equal to or slightly less than the bore of the roller bearing adapted to be interposed between the opposing ends of said axle and said ram, the ram engaging end of said adapter being provided with a recess and the outer end of said ram being provided with a projection adapted to engage said recess, the axle engaging end of said adapter being threaded for cooperation with the threaded end of said axle.

6. A device for removing the roller bearings of an outboard journal box from a railway car axle, said device comprising a portable power driven jack having a ram adapted to bear axially against the end of said axle, reach rods secured to the body of said jack and extending beyond the outer end of said ram, a stripper plate adapted to fit around the axle behind said journal box, a holder for said stripper plate, said stripper plate comprising an annular radially split member, and said stripper plate holder comprising an annular radially split member whose sections are each provided with outstanding lugs adapted to be removably secured to the outer end of each reach rod.

7. A device for removing the roller bearings of an outboard journal box from a railway car axle, said device comprising a wheeled power driven jack having a ram adapted to bear axially against the end of said axle, horizontal reach rods disposed on opposite sides of said jack, vertical pivots for securing said reach rods to the opposite sides of said jack, said rods extending beyond the outer end of said ram and having openings extending vertically through their outer ends, a stripper plate adapted to fit around the axle behind the journal box, a holder for said stripper plate, said stripper plate and holder being provided with cooperating rib-and-groove portions adapted to prevent relative movement thereof longitudinally of the axle, said holder being provided on opposite sides with outstanding lugs having vertical openings therein adapted to register with the vertical openings in the outer ends of said reach rods, and pins extending through said registering openings for removably securing said holder to the outer ends of said reach rods.

8. A device for removing the bearing of a journal box from a railway car axle, said device comprising a portable ram adapted to bear axially against the end of said axle, horizontal reach rods secured to the said device and extending on opposite sides of said ram beyond the outer end thereof, a radially split annular stripper plate adapted to fit around the axle behind said journal box, a horizontally split annular holder for said stripper plate located between the outer ends of said reach rods, and means for detachably securing the upper and lower sections of said horizontally split holder to the outer ends of said reach rods.

9. A device for removing the roller bearings of an outboard journal box from a railway car axle, said device comprising a wheeled power driven jack having a ram adapted to bear axially against the end of said axle, horizontal reach rods pivotally secured to the body of said jack and extending beyond the outer end of said ram on opposite sides thereof, a split annular stripper plate adapted to fit around the axle behind said journal box, a horizontally split annular holder for said stripper plate, the upper and lower sections of said holder being provided on opposite sides thereof with registering vertical openings and said reach rods being provided with similar openings adapted to be brought into register with the registering openings in said upper and lower sections, and pins extending through said opening in said sections and in said reach rods for removably securing said holder to said reach rods.

Signed at Canton, Ohio, this 18 day of August, 1930.

CLIFFORD L. EASTBURG.